M. J. OWENS.
MEANS FOR MAKING SHEET GLASS.
APPLICATION FILED JUNE 25, 1919.

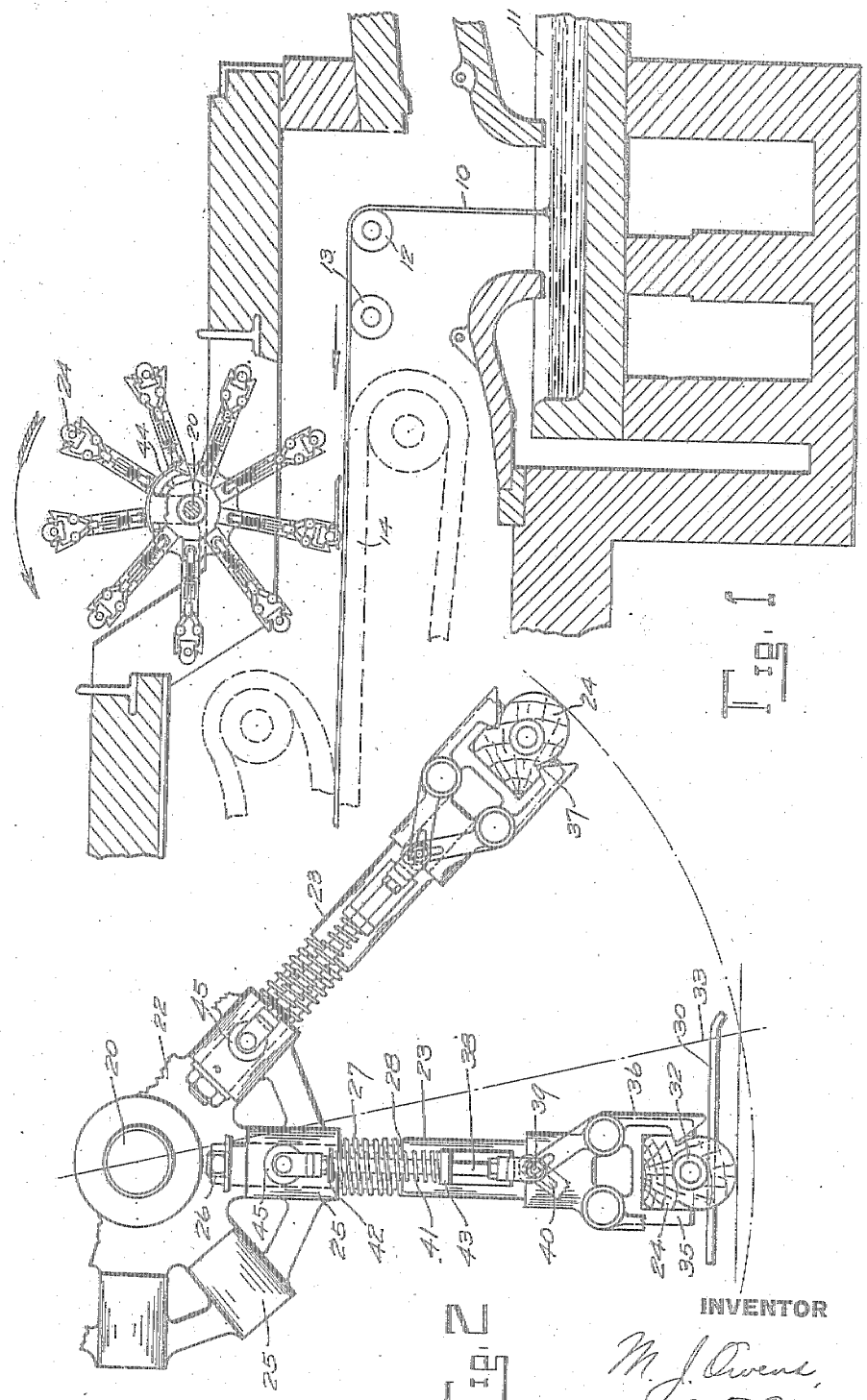

1,345,629.

Patented July 6, 1920
2 SHEETS—SHEET 2.

INVENTOR
M. J. Owens
By J. F. Rule
His attorney

UNITED STATES PATENT OFFICE.

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

MEANS FOR MAKING SHEET-GLASS.

1,345,629.　　　　　Specification of Letters Patent.　　Patented July 6, 1920.

Application filed June 25, 1919. Serial No. 306,592.

*To all whom it may concern:*

Be it known that I, MICHAEL J. OWENS, a citizen of the United States, residing at Toledo, in the county of Lucas and State of Ohio, have invented new and useful Improvements in Means for Making Sheet-Glass, of which the following is a specification.

My invention relates to apparatus for making sheet glass and more particularly to means for ironing out or smoothing the sheet while sufficiently hot and plastic to permit such operation. As herein shown, the invention is adapted for use with apparatus for making glass by the method which consists in continuously drawing the glass vertically in a sheet from a pool of glass, passing the sheet over a bending roll and drawing it horizontally through a leer. In making glass by this method the sheet of glass, if cooled sufficiently as it is drawn to prevent it from being marred by or taking the impression of the bending roll and drawing table, is not perfectly flat after passing the bending roll but more or less wavy.

An object of my invention is to provide practical means to smooth the glass and produce a high grade of glass with a smooth unmarked surface. In carrying out the invention I provide a series of smoothing devices in the form of bars extending transversely to the sheet of glass, said bars supported on arms extending radially from a rotary drive shaft above the sheet of glass, so that said bars are successively moved over the sheet in sliding contact therewith to flatten and smooth it.

Other objects of the invention and the exact nature thereof will appear more fully hereinafter.

This application contains subject matter disclosed in my co-pending application Serial Number 269,746, filed Jan. 6, 1919.

In the accompanying drawings:

Figure 1 is a part sectional elevation of an apparatus embodying the principles of my invention.

Fig. 2 is a detail view on a larger scale showing two of the smoothing devices and their mountings.

Figure 3:
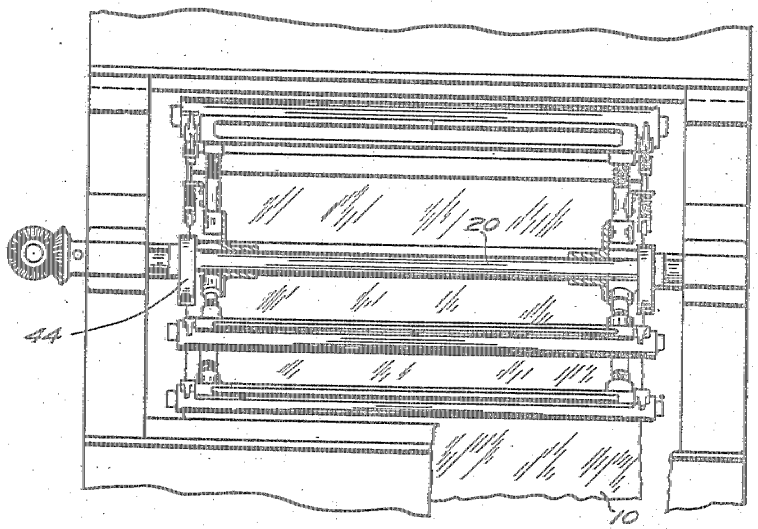
Fig. 3 is a plan view of the smoothing apparatus.
Figure 4:
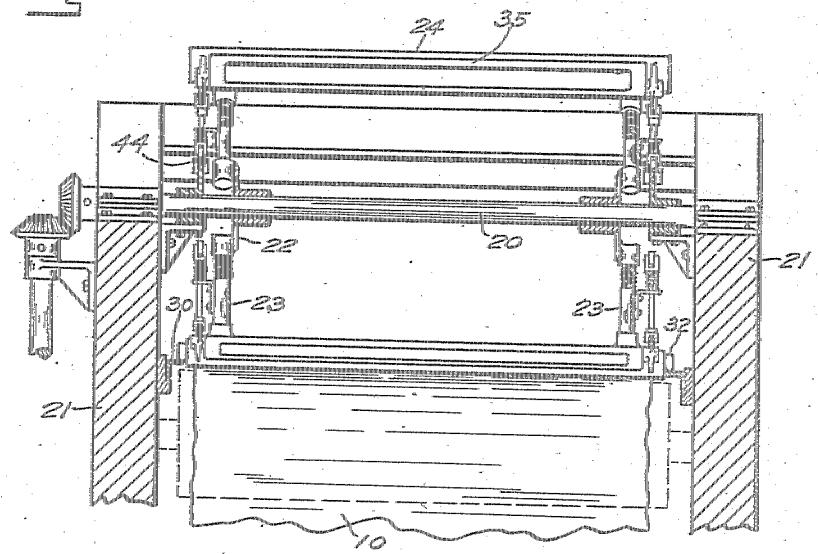
Fig. 4 is an elevation of the same.

The glass is drawn upward continuously in the form of a sheet 10 from a pool of molten glass contained in a receptacle 11 which may be a boot or extension of a continuous melting furnace. The sheet passes over a bending roll 12 and a supporting roll or rolls 13 to the endless drawing table 14 which may be of any approved construction. The traveling table 14 carries the glass to and through the leer in the usual way. As the glass moves upward from the pool its temperature is reduced sufficiently to permit a glaze to form on the surface, which prevents it from being marred by the roll 12 or taking any impression from said roll or from the drawing table 14.

An apparatus is provided for ironing out or smoothing the sheet as it passes the bending roll, so that the finished sheet is entirely free from all unevenness or waviness. This apparatus comprises a continuously rotating shaft 20 located above the sheet 10 and extending transversely thereof, said shaft journaled in the walls 21 at opposite sides of the sheet. Spiders 22 keyed or otherwise secured to the shaft 20 to rotate therewith, carry radial arms 23, at the outer ends of which are mounted smoothing bars 24. These bars are made of wood or other suitable material adapted to slide over the surface of the glass without marring it. The bars 24 are preferably of a length to extend entirely across the sheet and are arranged in an annular series, so that as the shaft 20 is rotated said bars are brought *seriatim* into sliding contact with the traveling sheet of glass therebeneath. As indicated by the arrows (Fig. 1) the smoothing bars and sheet move in opposite directions while in contact.

Figure 5:
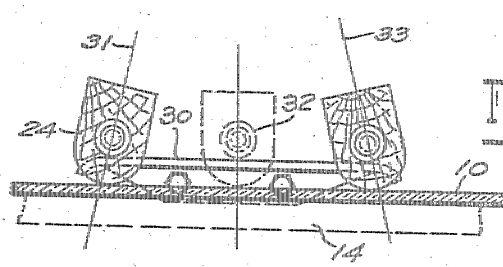
Fig. 5 is a detail showing the cam for guiding the smoothing bars along the surface of the glass.

In order that each smoothing bar may remain in contact with the glass for a suitable length of time, said blocks are arranged to yield radially when in contact with the glass. For this purpose the arms 23 are slidable lengthwise in bearing sleeves 25 formed on the spiders 22. A nut 26 on the inner threaded end of each arm limits its outward movement and is adjustable to vary the position of said arm. A coil spring 27 surrounding said arm bears at one end against the sleeve 25 and at its other end against a shoulder 28 formed on the arm, thereby yieldingly holding the smoothing bar at the outer limit of its radial movement. Stationary cams or tracks 30 supported on the walls 21 are arranged to engage guide rolls or lugs 32 on the ends of the bars 24. The guides 30 are substantially horizontal and are arranged to guide the bars 24 horizontally while in contact with the sheet of glass. As indicated in Fig. 5, the bar 24 is brought into contact with the glass when it reaches the position indicated by the radial line 31 and remains in contact with the glass until it has reached the position indicated by the line 33. As the glass and smoothing bar are traveling in opposite directions the area covered by each bar is greater than if the glass were stationary. The area traversed by each bar overlaps that of the preceding and succeeding bars so that the entire surface of the glass is subjected to the smoothing action of said bars. With the construction shown the speed of the smoothing bars is preferably substantially that of the glass, although the relative speed may be varied. If desired, the smoothing bars may be driven in the same direction that the glass moves, in which case they would be operated at a higher speed in order to cover the entire surface of the glass. In any event the smoothing bars are so arranged that the area covered by each bar overlaps that covered by the preceding bar.

The smoothing bars are preferably so mounted that they can be easily and quickly removed while the apparatus is operating. Each bar 24 is seated in a channel iron 35 attached at its ends to the arms 23. Pivoted at each end of the channel iron 35 are gripping arms 36 having jaws to seat in notches 37 formed in the bars 24. The jaws are held in gripping position by means of a spring actuated rod 38 carrying a pin 39 working in slots 40 in the upper inclined ends of the arms 36. A coil spring 41 surrounding the rod 38 bears at one end against a stop 42 on said rod and at its opposite end against a stop lug 43 on the arm 23. The clamping jaws are automatically released by stationary cams 44 which engage rolls 45 on the ends of the rolls 38 and force said rods outwardly as the smoothing bars move upward. It will thus be seen that as each smoothing bar 24 approaches its uppermost position the corresponding grippers 36 are released therefrom, permitting said bar to be quickly removed by an operator, either by sliding it lengthwise in the channel 35 or lifting it directly out of said channel. Any smoothing bar that becomes worn, burnt or otherwise defective can therefore be quickly removed and replaced by a new bar without interfering with the continuous operation of the mechanism. The shaft 20 may be driven through suitable gearing from the same shaft that drives the drawing table 14. Any approved means may be provided, if desired, for wetting or otherwise cooling the smoothing bars.

Modifications may be resorted to without departing from the spirit and scope of my invention.

What I claim is:

1. The combination with means for drawing a sheet of glass, of a bending roll over which the glass is drawn, and a flattening device moving over the surface of the glass in a direction lengthwise thereof.

2. The combination with means for drawing a sheet of glass, of a bending roll over which the glass is drawn, and a flattening device comprising a bar extending transversely the sheet of glass and moving over the surface of the glass in a direction lengthwise of the sheet.

3. The combination with means for continuously drawing a sheet of glass, of means for flattening the glass, said flattening means moving over the surface of the glass in contact therewith in a direction lengthwise of the sheet, and means to support the surface of the glass opposite said flattening means.

4. The combination of means for continuously drawing a sheet of glass, and means for smoothing or flattening the sheet comprising a series of flattening bars arranged to successively engage a surface of the sheet and move in contact therewith in a direction lengthwise of the sheet.

5. The combination of means for continuously drawing a sheet of glass, and means for smoothing or flattening the sheet comprising a series of flattening bars arranged to successively engage a surface of the sheet and move in contact therewith in a direction lengthwise of the sheet, said bars extending transversely of the sheet and each moving over and in contact with an area overlapping that of the preceding and succeeding bars.

6. The combination with means to continuously draw a sheet of glass from a pool of molten glass, of a support over which the sheet is drawn, said sheet being free from surface contact until it reaches said support and permitted to cool during its passage to said support and thereby form a surface glaze that will not be marred by said support, and a smoothing or flattening means operating on the surface of the glass beyond said support to remove waviness or unevenness in the sheet, said flattening means comprising a series of parallel bars extending transversely of the sheet and arranged to be brought successively into engagement with the sheet and move lengthwise of the sheet in contact therewith.

7. The combination of means to continuously draw a sheet of glass from a pool of molten glass, comprising a flat horizontal drawing table, a bending roll over which the sheet is drawn, and a flattening device located over said table, said device comprising a driving element extending transversely of the sheet and a series of flattening bars arranged around said driving element and moved thereby successively into engagement with the sheet of glass.

8. The combination of means to continuously draw a sheet of glass from a pool of molten glass, comprising a flat horizontal drawing table, a bending roll over which the sheet is drawn, and a flattening device located over said table, said device comprising a driving element extending transversely of the sheet and a series of flattening bars arranged around said driving element and moved thereby successively into engagement with the sheet of glass, said bars being mounted to yield radially inward when brought in contact with the sheet, thereby permitting them to move horizontally while in contact with the sheet.

9. A flattening device comprising in combination, a rotary driver, radial arms thereon, and flattening bars carried at the outer ends of said arms, said arms mounted to yield radially inward.

10. A flattening device comprising in combination, a rotary driver, radial arms thereon, flattening bars carried at the outer ends of said arms, said arms mounted to yield radially inward, gripping devices to hold said bars, and automatic means to periodically actuate said gripping devices to release the bars and permit their removal.

11. The combination with means for drawing a sheet of glass, of a smoothing device comprising an annular series of parallel smoothing bars, means to rotate said device to bring the bars successively into contact with the glass, said bars mounted to yield inwardly while in contact with the glass to permit a straight line movement of the bars along the surface of the glass, and a cam arranged to control said straight line movement.

Signed at Toledo, in the county of Lucas and State of Ohio, this 20th day of June, 1919.

MICHAEL J. OWENS.